(12) United States Patent
Huang

(10) Patent No.: US 10,877,523 B2
(45) Date of Patent: Dec. 29, 2020

(54) FLEXIBLE DISPLAY DEVICE AND MOBILE TERMINAL

(71) Applicant: EverDisplay Optronics (Shanghai) Limited, Shanghai (CN)

(72) Inventor: Huanyu Huang, Shanghai (CN)

(73) Assignee: EverDisplay Optronics (Shanghai) Limited, Shanghai (CN)

(*) Notice: Subject to any disclaimer, the term of this patent is extended or adjusted under 35 U.S.C. 154(b) by 0 days.

(21) Appl. No.: 16/715,179

(22) Filed: Dec. 16, 2019

(65) Prior Publication Data

US 2020/0192434 A1  Jun. 18, 2020

(30) Foreign Application Priority Data

Dec. 17, 2018  (CN) .......................... 2018 1 1544437

(51) Int. Cl.
*G06F 1/16* (2006.01)
*H04M 1/02* (2006.01)

(52) U.S. Cl.
CPC .......... *G06F 1/1652* (2013.01); *G06F 1/1681* (2013.01); *H04M 1/0235* (2013.01); *H04M 1/0268* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,800,834 A | * | 1/1989 | Feng | E04H 12/182 116/173 |
| 7,639,237 B2 | * | 12/2009 | Perkins | G06F 1/1615 345/156 |
| 7,830,333 B2 | * | 11/2010 | Aoki | G06F 1/1601 345/1.3 |
| 7,965,258 B2 | * | 6/2011 | Aoki | G06F 1/1601 345/1.3 |
| 8,378,932 B2 | * | 2/2013 | Fein | G06F 1/1652 345/30 |
| 8,493,726 B2 | * | 7/2013 | Visser | G06F 1/1601 361/679.3 |
| 8,508,920 B2 | * | 8/2013 | Huitema | G09F 9/301 312/223.3 |
| 8,711,566 B2 | * | 4/2014 | O'Brien | G06F 1/1624 361/724 |
| 9,111,470 B2 | * | 8/2015 | Anderson | G09F 9/301 |

(Continued)

*Primary Examiner* — Lisa Lea-Edmonds
(74) *Attorney, Agent, or Firm* — Yunling Ren

(57) ABSTRACT

A flexible display device and a mobile terminal are provided. The flexible display device includes: a flexible display panel; two reels, each of two ends of the flexible display panel is coupled to the reel; two housings, each of the housings is used to respectively sleeve the reel and each of the housings includes an opening which allows the flexible display panel to go through; a telescope support member includes two ends respectively coupled to the side wall of each of the housings; the flexible display panel is able to be rolled up and the telescope support member is to be shortened when the two housings move towards each other, the flexible display panel is able to be extended and the telescope support member is to be lengthened and the distance between the two housings is limited within the dimension of the telescope support when the two housings move away from each other.

10 Claims, 9 Drawing Sheets

(56) References Cited

U.S. PATENT DOCUMENTS

| | | | | |
|---|---|---|---|---|
| 9,195,272 | B2* | 11/2015 | O'Brien | G06F 1/1624 |
| 9,655,267 | B2* | 5/2017 | Cope | H05K 7/14 |
| 9,880,456 | B1* | 1/2018 | Yellin | G03B 21/58 |
| 9,924,603 | B2* | 3/2018 | Cope | H05K 7/14 |
| 10,082,826 | B1* | 9/2018 | Salmon | G09F 9/301 |
| 10,098,246 | B1* | 10/2018 | Cope | H05K 7/14 |
| 10,306,782 | B2* | 5/2019 | Malik | H05K 5/0017 |
| 2003/0051410 | A1* | 3/2003 | Cloutier | G09F 7/20 |
| | | | | 49/322 |
| 2013/0201638 | A1* | 8/2013 | Kim | G02F 1/133305 |
| | | | | 361/749 |
| 2014/0268532 | A1* | 9/2014 | Nicol | G09F 9/301 |
| | | | | 361/679.26 |
| 2017/0290175 | A1* | 10/2017 | Malik | G09F 15/0062 |
| 2019/0141843 | A1* | 5/2019 | Park | H05K 1/189 |
| 2020/0025325 | A1* | 1/2020 | Wu | G09F 15/0031 |

* cited by examiner

FLEXIBLE DISPLAY DEVICE AND MOBILE TERMINAL

CROSS REFERENCE

This disclosure is based upon and claims the benefit of priority of Chinese Patent Application No. 201811544437.6, filed on Dec. 17, 2018, the entire contents thereof are incorporated herein by reference.

TECHNICAL FIELD

The present disclosure relates to the field of display technology, specifically to a flexible display device and mobile terminal.

BACKGROUND

With the developing requirements of display products, there are lots of restrictions of the ordinary display panel on product design, which has driven the development and application of flexible display panel.

Flexible display products are bendable, foldable, and easy to carry, and have various exterior designs, which bring innovation and aesthetics, and meets diversified needs of usage.

However, the existing flexible display panel products are easily damaged due to applying uneven force during the rolling up and extending process, and cannot be well supported after being extended, which may cause warping and affect the use.

SUMMARY

In view of this, the present disclosure provides a flexible display device and a mobile terminal, which overcome the problems of damage caused by uneven force during rolling up and extending process, and prevents warping caused by poor support after being extended.

In some embodiments of the present disclosure, a flexible display device includes a flexible display panel, two reels, two housings and a telescope support member, each of two ends of the flexible display panel is coupled to the reel, each of the housings is used to respectively sleeve the reel and each of the housings includes an opening which allows the flexible display panel to go through, the telescope support member includes two ends respectively coupled to the side wall of each of the housings, the flexible display panel is able to be rolled up and the telescope support member is to be shortened when the two housings move towards each other, the flexible display panel is able to be extended and the telescope support member is to be lengthened and the distance between the two housings is limited within the dimension of the telescope support when the two housings move away from each other.

In some other embodiments of the present disclosure, a mobile terminal includes a flexible display device further including a flexible display panel, two reels, two housings and a telescope support member, each of two ends of the flexible display panel is coupled to the reel, each of the housings is used to respectively sleeve the reel and each of the housings includes an opening which allows the flexible display panel to go through, the telescope support member includes two ends respectively coupled to the side wall of each of the housings, the flexible display panel is able to be rolled up and the telescope support member is to be shortened when the two housings move towards each other, the flexible display panel is able to be extended and the telescope support member is to be lengthened and the distance between the two housings is limited within the dimension of the telescope support when the two housings move away from each other.

It should be understood that the above general description and the following detailed description are merely exemplary and explanatory, and should not limit the scope of the present disclosure.

BRIEF DESCRIPTION OF THE DRAWINGS

Embodiments of the present disclosure will now be described, by way of example only, with reference to the accompanying schematic drawings in which corresponding reference symbols indicate corresponding parts. For those ordinary skilled in the art, other drawings can be obtained based on these drawings without creative efforts.

DETAILED DESCRIPTION

In the following, embodiments of the present disclosure will be described in detail referring to figures. The concept and its realizations of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to the technicians in the art fully. Same reference signs in the figures refer to same or similar structures, so repeated description of them will be omitted.

The features, structures or characteristics described can be combined in any appropriate way in one or more embodiments. In the description below, many specific details are provided to explain the embodiments of the present disclosure fully. However, the technicians in the art should realize that, without one or more of the specific details, or adopting other methods, components, materials etc. the technical proposal of the present disclosure can still be realized. In certain conditions, structures, materials or operations well known are not shown or described in detail so as not to obfuscate the present disclosure. The technical contents of the present disclosure will be further described below with reference to the figures and embodiments. It should be stated that a plurality of embodiments described below along with their combinations and varieties, beyond doubt are within the scope of the present disclosure.

Figure 1:
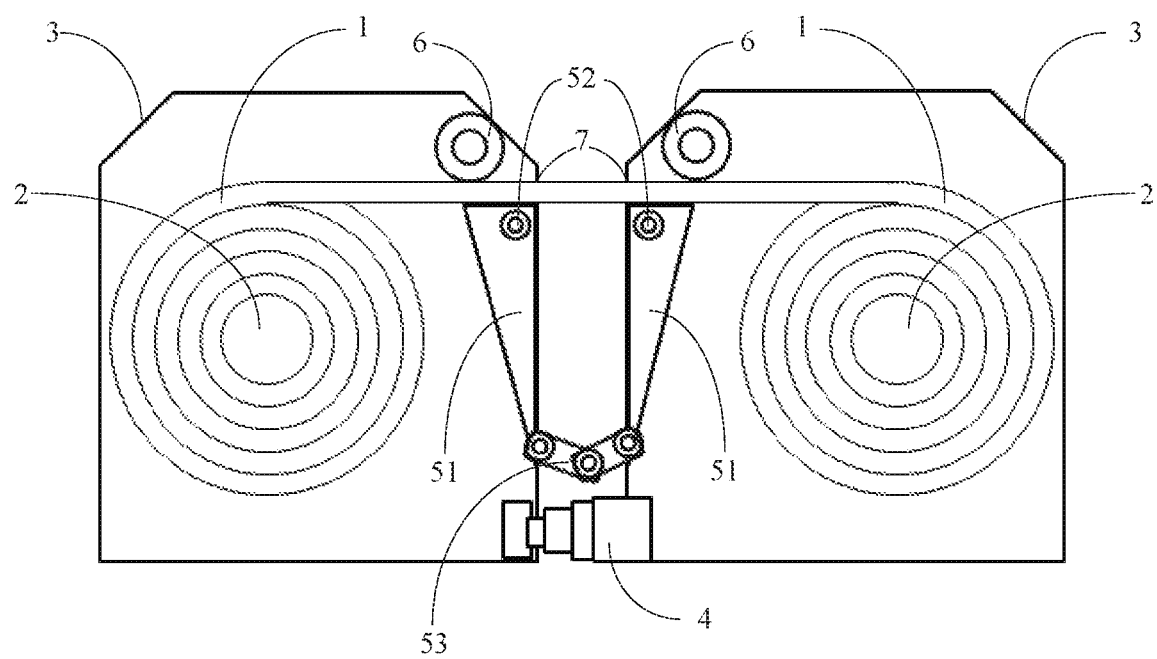
FIG. 1 shows a schematic rolled up view of the flexible display device of one embodiment of the present disclosure.
Figure 2:
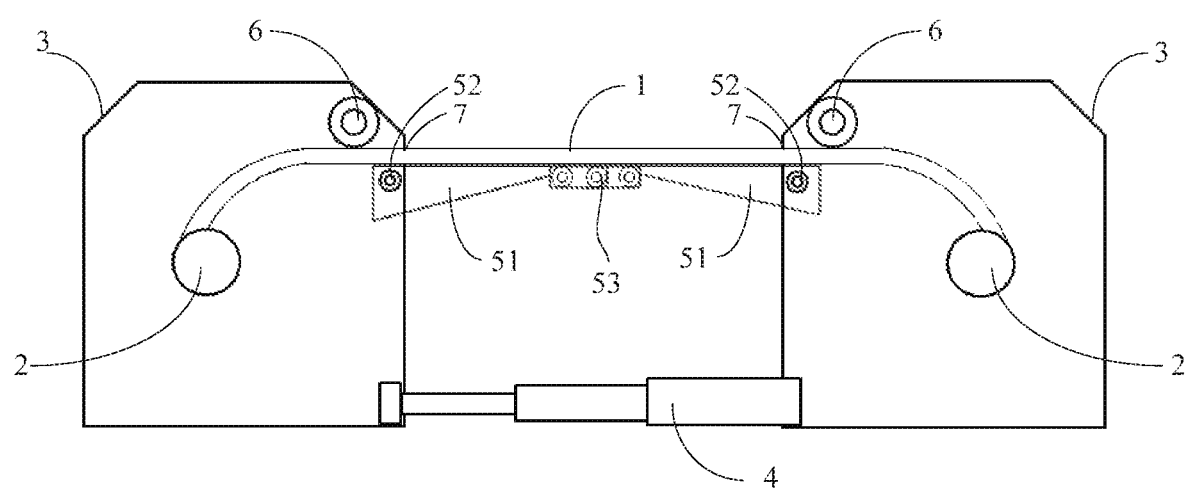
FIG. 2 shows a schematic full extended view of the flexible display device of FIG. 1.
Figure 3:
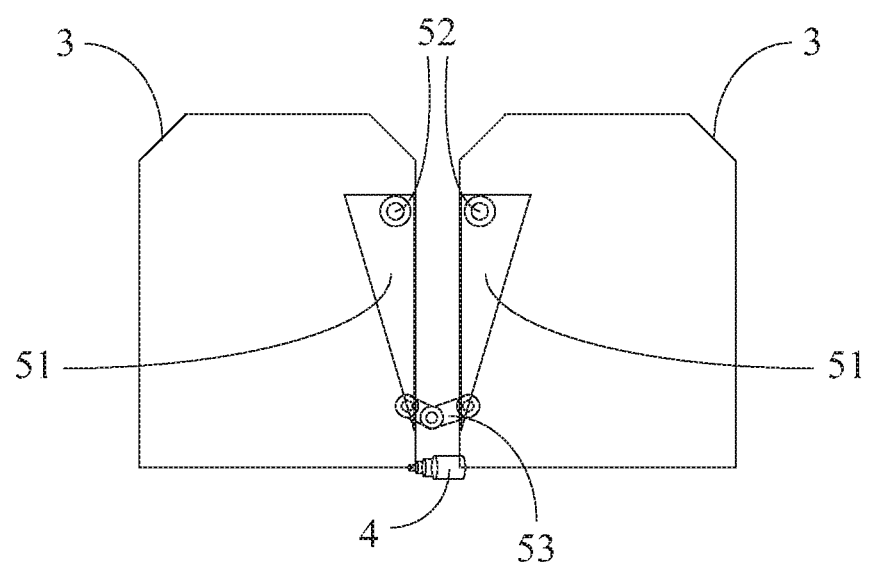
FIG. 3 shows a schematic rolled up view of the telescope support member and the right-angled support plates of the flexible display device of FIG. 1.
Figure 4:
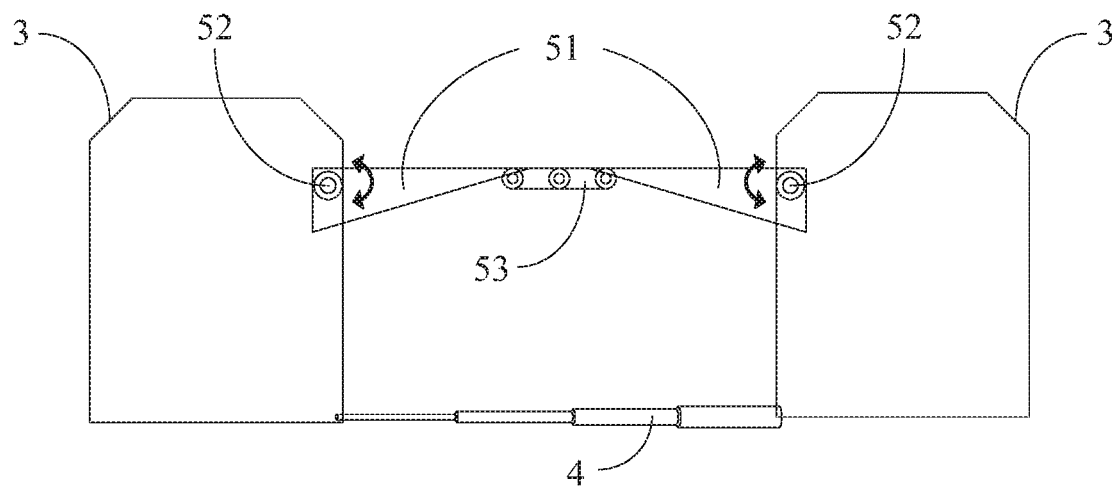
FIG. 4 shows a schematic full extended view of the telescope support member and the right-angled support plates of the flexible display device of FIG. 1.
Figure 5:
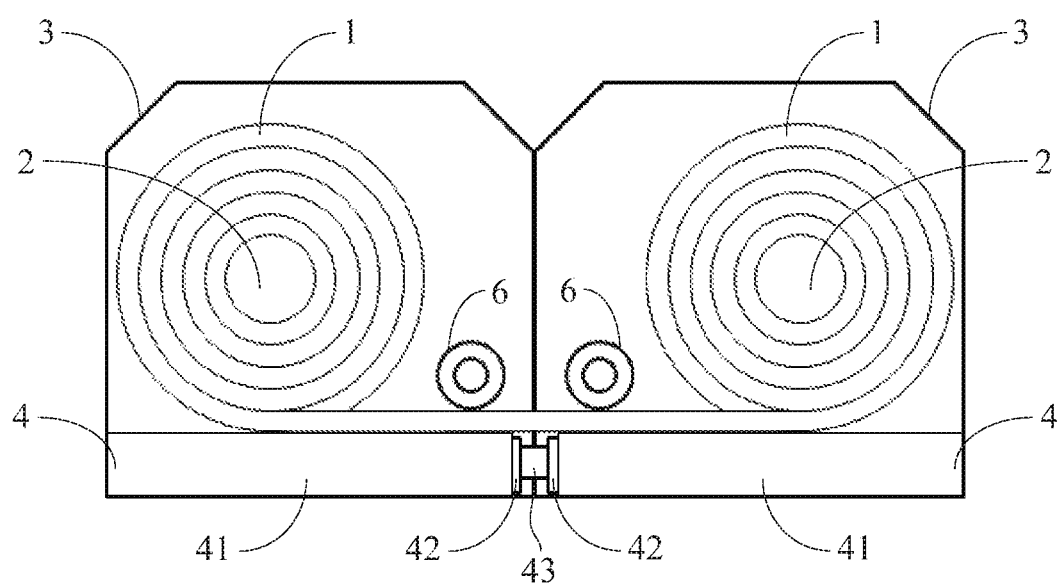
FIG. 5 shows a schematic rolled up view of the flexible display device of another embodiment of the present disclosure.
Figure 6:
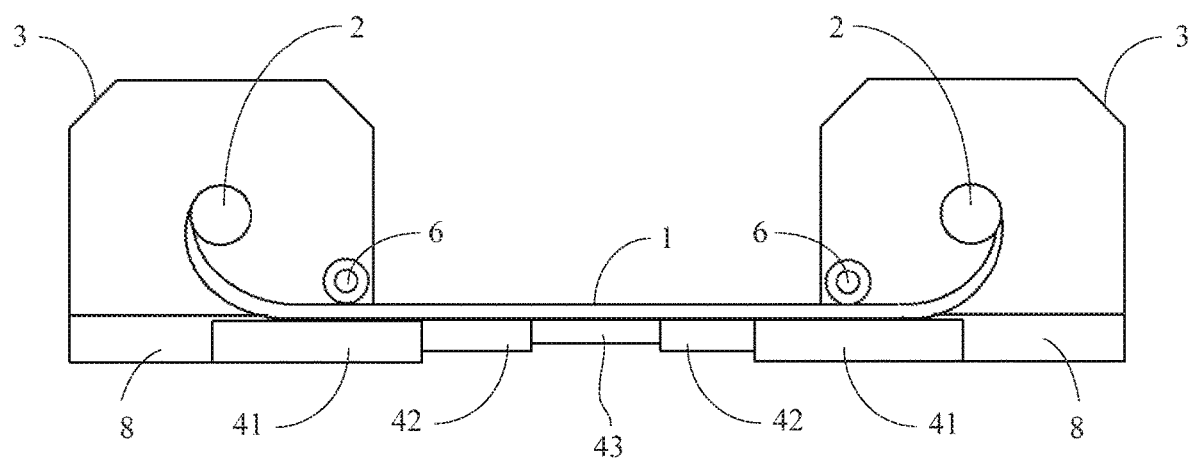
FIG. 6 shows a schematic full extended view of the flexible display device of FIG. 5.

Referring to FIGS. 1, 2, 5, 6 and 9, the flexible display device according to the embodiment includes:

A flexible display panel 1, the flexible display panel is able to be rolled up and be extended. FIGS. 1 and 5 are schematic views of illustrating the flexible display panel being rolled up. FIGS. 2 and 6 are schematic views of illustrating the flexible display panel being fully extended.

Two reels 2, each of two ends of the flexible display panel 1 is respectively coupled to each of the reels 2. Referring to FIGS. 2 and 6, each of two ends of the flexible display panel 1 are respectively coupled to the two reels 2 and the flexible display panel 1 is able to be rolled up or extended in response to interactive movements between the two reels 2. With the two reels 2, the flexible display panel 1 is evenly forced at both ends during the rolling up and extending process, to ensure the flexible display panel 1 being smoothly rolled up and extended, and to avoid the damage, caused by the uneven force, of the flexible display panel 1.

Two housings 3, each of the housings 3 is used to respectively sleeve each of the reels 2 and each of the housings 3 includes an opening 7 which allows the flexible display panel 1 to go through. The openings 7 are provided at the position where the flexible display panel 1 goes through the housing 3 during the flexible display panel 1 being rolled up or extended. The openings 7, facing each other, are respectively formed on the side walls of each of the housings 3.

A telescope support member 4 includes two ends respectively coupled to the side wall of each of the housings 3. The telescope support member 4 is to be shortened when the two housings 3 is close to each other, and at that time the flexible display panel 1 is rolled up. The telescope support member 4 of FIG. 1 may be further shortened, so that opposite side walls of the two housings 3 fit together to reduce the volume of the flexible display device in the rolling up state. The flexible display panel 1 is able to be extended and the telescope support member 4 is to be lengthened when the two housings 3 is away each other. The telescope support member 4 is lengthened at several lengths, which provides several predefined distances between the two housings 3, so that the flexible display panel 1 is extended and maintained to a predefined extension state (either fully or partially extended). The flexible display panel 1 is ensured to not have damages caused by over extended. In some embodiments, the telescope support member 4 is lengthened and maintaining to a predefined level to limit the distance between the two housings 3. The flexible display 1 is maintained to stay at a predefined extension state. For example, with a predefined maximum lengthened length of the telescope support member 4, the distance between the two housings 3 is equal to the predefined maximum lengthened length when the flexible display panel 1 is fully extended. The flexible display panel 1 is ensured to not have damage caused by being over extended.

In some embodiments, the telescopic support member 4 is provided as a telescopic rod structure which is shown in FIG. 1 to FIG. 4. Moreover, the flexible display device further includes two right-angled support plates 51 which are respectively disposed in each of the housings 3 and are hinged each other by a hinge 53. The right-angled end of each of the right-angled support plates 51 is coupled to an internal wall of the housing 3 by a shaft 52 which allows the right-angled support plate 51 to be rotated.

When the flexible display panel is rolled up, the right-angled support plates 51 are received respectively by the two housing 3. The short right-angled side of the two right-angled support plates 51 is leaned on a backside of the flexible display panel 1. The right-angled end of each right-angled support plates 51 is coupled to the internal wall of the housing 3 by a shaft 52 and the acute-angled ends of the right-angled support plates 51 are hinged by a hinge 53. When the flexible display panel 1 is extended, the two housings 3 is away each other, and the right-angled support plates 51 rotates as the housings 3 being away. The long right-angled sides and the hinge 53 are leaned on a backside of the flexible display panel 1 until the long right-angled side of the two right-angled support plates 51 aligned.

In some embodiments, a plurality of sub-support plates hinged to each other is provided between the two right-angled support plates 51. The hinged sub-support plates is received by the housing 3 when the flexible display panel 1 is rolled up, the hinged sub-support plates and the two right-angled support plates 51, are all leaned on a backside of the flexible display panel 1 when the flexible display panel 1 is extended.

In some embodiments, the right-angled ends of the two right-angled support plates 51 is set with a slight are (not shown) to improve the rotation of the right-angled support plate 51 and prevent the backside of the flexible display panel 1 from scratching made by the right-angled ends.

In some embodiments, the maximum lengthened length of the telescope support member 4 is equal to the length of the two aligned long right-angled sides of the two right-angled support plates 51. The flexible display panel 1 will be supported by the telescope support member 4 and the right-angled support plates 51.

Figure 9:
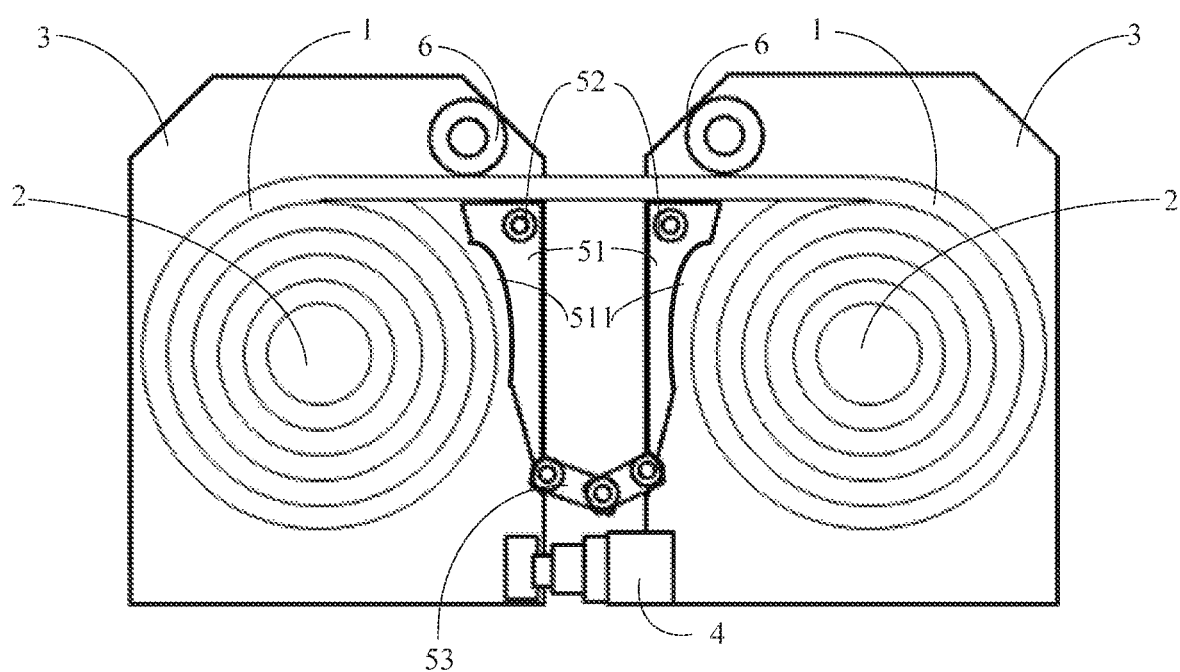
FIG. 9 shows a schematic rolled up view of the flexible display device with an avoidance space of the present disclosure.

Furthermore, referring FIG. 9, in some embodiments, an avoidance space 511 for avoiding the flexible display panel 1 is dispose adjacent to the right-angled support plate 51. Specifically, the hypotenuse side of the right-angled support plate 51 is concaved to form the avoidance space 511 so as to have enough space for storing the flexible display panel 1.

Furthermore, the long right-angled side of the right-angled support plate 51 includes adsorption micro-pores. The adsorption micro-pores are filled with a nano-static adsorption material, such that the backside of flexible display panel 1 is adsorbed on the long right-angled sides of the two right-angled support plates 51 when the flexible display panel 1 is fully extended. The flexible display panel 1 is ensured to be flat and avoid bending.

Furthermore, the flexible display device is also provided with driven shafts 6 respectively disposed in the two housings 3. During the roll upor extending process of the flexible display panel 1, the driven shafts 6 work with the reels 2 to guide the flexible display panel 1, and the flexible display screen 1 is located within the driven shafts 6 and the right-angle support plates 51 for ensuring the flexible display panel 1 to have smooth plane.

The flexible display device of the above embodiments is provided with two reels 2, so that the flexible display panel 1 is evenly forced on the two ends to prevent the flexible display panel 1 from being damaged due to uneven force, when the flexible display panel 1 is rolled upor extended. The flexible display panel 1 is supported by telescope support member 4 which provides predefined positions for the housing 3 to ensure the flatness and stability of the flexible display panel 1 after the flexible display panel 1 is extended. The right-angle support plates 51 are stored in the vacant position in the housing 3 when the flexible display panel 1 is rolled up. When the flexible display 1 is extended, the right-angle support plates 51 and the telescope support member 4 are used to hold the position of the housing 3 and support the flexible display panel 1.

In some embodiments of the present disclosure further provide a mobile terminal, including the flexible display device described in any of the foregoing embodiments.

Referring FIG. 5 to FIG. 8, in some embodiments, each of the housings 3 includes a sliding groove 8. The sliding grooves 8 are provided under the flexible display panel 1 for receiving the telescope support member 4, and the telescope support member 4 includes the followings.

Two first support members 41, respectively sliding fit in the two sliding grooves, and a first receiving space is formed between two ends, facing each other, of the two first support members 41, the two ends refer to the ends close to each other.

Two second support members 42, respectively sliding fit in the first receiving space, and a second receiving space is formed between two ends, facing each other, of the two second support members. The second supporting member 42 is shown in FIGS. 7 and 8 with dashed lines.

A third support member 43, sliding fit in the second receiving space. The third support member 43 is shown in FIG. 7 and FIG. 8 with thick solid lines.

Figure 7:
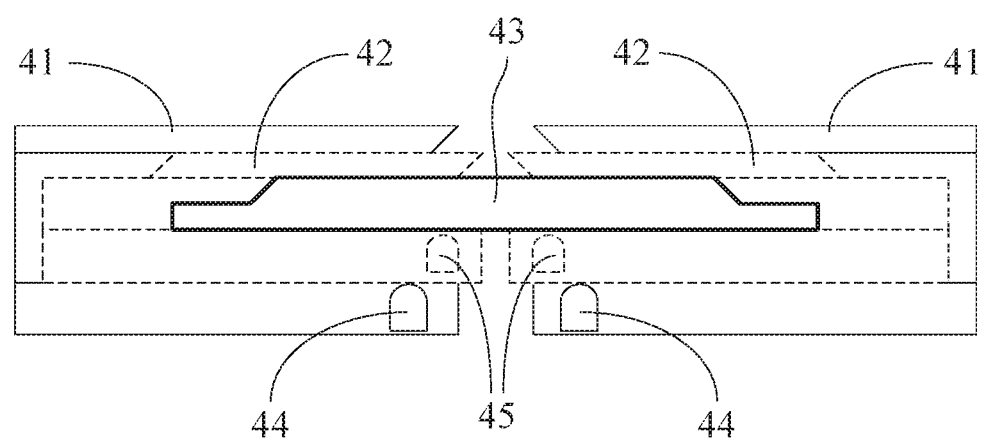
FIG. 7 shows a schematic rolled up view of the telescope support member of the flexible display device of FIG. 5.

When the flexible display panel 1 is rolled up, referring to FIGS. 5 and 7, the third support member 43 is received in the second receiving space and the two second support members 42 are respectively received in the first receiving space. The two first support members 41 are respectively received in the two sliding grooves and the opposite side walls of the two housings 3 fit together to reduce the size of the flexible display device in the rolling up state.

Figure 8:
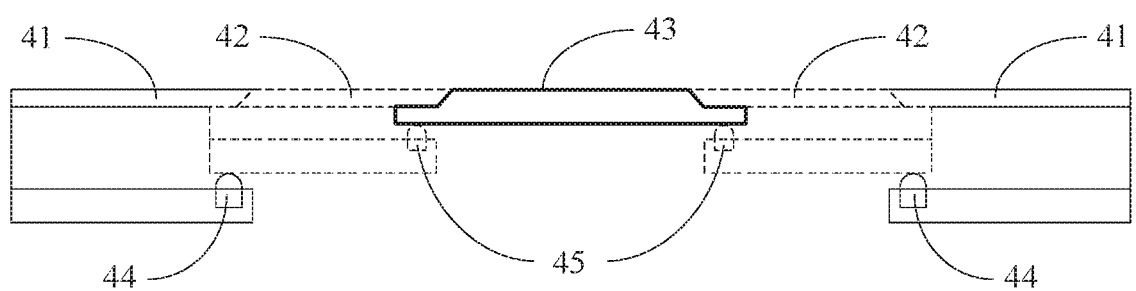
FIG. 8 shows a schematic full extended view of the telescope support member of the flexible display device of FIG. 5.

When the flexible display panel 1 is extended, referring to FIGS. 6 and 8, the third support member 43 is out of the second receiving space and is aligned with the two second support members 42. The two second support members 42 are out of the first receiving space and are aligned with the two first support members 41. The two first support members 41, the two second support members 42 and the third support member 43 are leaned on the backside of the flexible display panel 1.

With the structure of the third support member 43 slide fit between the two second support members 42, the two second support members 42 slide fit between the two first support members 41 and the two first support members 41 slide fit between the sliding grooves of the housing 3, the telescope support member 4 is completely received in the housings 3 when the flexible display panel 1 is rolled up. When the flexible display panel 1 is extended, the telescope support member 4 is out of the housings 3. The two first support members 41, the two second support members 42 and the third support member 43 are leaned on the backside of the flexible display panel 1.

In some embodiments, the telescope support member 4 includes multi-level sub-support members which slide fit with each other. For example, the telescope support member 4 includes an Nth sub-support member slide fit between two N+1th sub-support members, two N+1th sub-support members slide fit between two N+2 th sub-support members, two N+2 th sub-support members slide fit between two N+3 th sub-support members . . . two N+nth sub-support members slide fit between two N+n+1th sub-support members, N and n are positive integers used to describe the level number of the sub-support members. The principle is similar to that of the above-mentioned telescope support member 4, and not be repeated herein.

In some embodiments, the telescope support member 4 further comprises two first poles 44, respectively movable in laid at the two ends, facing each other, of the two first support members 41. With extending of the flexible display panel 1, the two second support members 42 are lifted by the first poles 44 to be aligned with the two first support members 41. Two second poles 45, respectively movable in laid at the two ends, facing each other, of the two second support members 42. With extending movements of the flexible display panel, the two ends of the third support member 43 are lifted by the second poles 45 to be aligned with the second support members 42.

Furthermore, in some embodiments, referring to FIGS. 7 and 8, the two ends of the third support members 43 and the opposing ends of the two second support members 42 are respectively fit by chamfers. Each of two distal ends of the second support members 42 respectively fits chamfers, facing each other, of the two first support members 41. With the fining structure of the ends and the chamfers, the two first support members 41, the two second support members 42 and the third support member 43 work smoothly, when the flexible display panel 1 is rolled up or extended.

In order to ensure the flexible display panel 1 is maintained as a flat panel and avoid being bended during the flexible display panel 1 being extended, the surface of the first support members 41, the second support members 42 and the third support member 43 includes adsorption micro-pores. In some embodiments, adsorption micro-pores are filled with a nano-static adsorption material.

Furthermore, the flexible display device is also provided with driven shafts 6 respectively disposed in the two housings 3. During the roll upor extending process of the flexible display panel 1, the driven shafts 6 work with the reels 2 to guide the flexible display panel 1, and the flexible display screen 1 is located within the driven shafts 6 and the right-angle support plates 51 for ensuring the flexible display panel 1 to have smooth plane.

The flexible display device of the above embodiments is provided with two reels 2. The flexible display panel 1 is evenly forced on the two ends when being rolled up or extended to prevent the flexible display panel 1 from being damaged due to uneven force. The flexible display panel 1 is supported by telescope support member 4. The telescope support member 4 is lengthened at several lengths which provide several predefined distance between the housings 3 to ensure the flatness and stability of the extended flexible display panel 1. The telescope support member 4 is formed with the structure including a plurality of sub-support members slide in laid with each other. The telescope support member 4 is received in the two housings 3 when the flexible display panel 1 is rolled up. The spare space of the housings 3 is fully utilized and the volume of the flexible display device is reduced. When the flexible display panel 1 is extended, the sub-support members of the telescope support member 4 support the flexible display panel 1.

In some embodiments of the present disclosure, a mobile terminal, including the flexible display device described in any of the foregoing embodiments is further provided.

Compared with the prior art, the beneficial effects of the present disclosure are the followings.

The flexible display device of the present disclosure is provided with two reels to make the flexible display panel being evenly forced on the two ends when being rolled upor extended, so as to avoid the damage caused by uneven force.

A telescope support member is provided to support the flexible display panel and limit the housing, which ensures the flatness and stability of the flexible display panel after being extended.

The foregoing exemplary embodiments and advantages are merely exemplary and are not to be construed as limiting. It should be noted that those skilled in the art can make improvements and modification without departing from the principles of the present disclosure, and these improvements and modifications are also within the protection scope of the present disclosure.

What is claimed is:

1. A flexible display device, comprising:
a flexible display panel;
two reels, wherein each of two ends of the flexible display panel is coupled to the reel;
  two housings, wherein each of the housings is used to respectively sleeve the reel and each of the housings includes an opening which allows the flexible display panel to go through;
  a telescope support member includes two ends respectively coupled to the side wall of each of the housings;
  wherein the flexible display panel is able to be rolled up and the telescope support member is to be shortened when the two housings move towards each other;
  wherein the flexible display panel is able to be extended and the telescope support member is to be lengthened and the distance between the two housings is limited within the dimension of the telescope support when the two housings move away from each other;
  wherein the telescope support member includes multi-level sub-support members which slide fit with each other, multi-level sub-support members includes:
  two N+2th sub-support members, receiving space is formed between two ends, facing each other, of the two N+2th sub-support members;
  two N+1th sub-support members, respectively sliding fit in the receiving space of the N+2th sub-support members, receiving space is formed between two ends, facing each other, of the two N+1th sub-support members;
  an Nth sub-support member, sliding fit between two N+1th sub-support members, wherein N is a positive integer used to describe the level number of the sub-support members.

2. The flexible display device of claim 1 further comprising:
  two right-angled support plates respectively disposed in each of the housings and hinged each other by a hinge, wherein the right-angled end of each of the right-angled support plates is rotatably coupled to an internal wall of the housing;
  wherein when the flexible display panel is fully extended, the long right-angled side of the two right-angled support plates are aligned, and the long right-angled sides and the hinge are leaned on a backside of the flexible display panel.

3. The flexible display device of claim 2, wherein a maximum lengthened length of the telescope support member is equal to a length of the two aligned long right-angled sides.

4. The flexible display device of claim 2, wherein a hypotenuse side of the right-angled support plate is concaved to form an avoidance space for avoiding the flexible display panel.

5. The flexible display device of claim 2, wherein the long right-angled side of the right-angled support plate includes adsorption micro-pores.

6. The flexible display device of claim 1, wherein each of the housings includes a sliding groove and the telescope support member includes:
  two first support members, respectively sliding fit in the two sliding grooves, and a first receiving space is formed between two ends, facing each other, of the two first support members;
  two second support members, respectively sliding fit in the first receiving space, and a second receiving space is formed between two ends, facing each other, of the two second support members; and
  a third support member, sliding inlaid in the second receiving space;
  wherein when the flexible display panel is rolled up, the third support member is received in the second receiving space, the two second support members are respectively received in the first receiving space, the two first support members are respectively received in the two sliding grooves;
  wherein when the flexible display panel is extended, the third support member is out of the second receiving space and is aligned with the two second support members;
  wherein the two second support members are out of the first receiving space and are aligned with the two first support members;
  wherein the two first support members, the two second support members and the third support member are leaned on the backside of the flexible display panel.

7. The flexible display device of claim 6, wherein the telescope support member further comprises:
  two first poles, respectively movable inlaid on the two ends, facing each other, of the two first support members, and the second support members are lifted by the first poles accompanying with extending of the flexible display panel;
  two second poles, respectively movable inlaid on the two ends, facing each other, of the two second support members, and the two ends of the third support member are lifted by the second poles accompanying with extending movements of the flexible display panel.

8. The flexible display device of claim 6, wherein the two ends of the third support members and the opposing ends of the two second support members are respectively fit by chamfers, and each of two distal ends of the second support members respectively fit chamfers, facing each other, of the two first support members.

9. The flexible display device of claim 6, wherein the surface of the first support members, the second support members and the third support member includes adsorption micro-pores.

10. A mobile terminal, comprising:
  a flexible display device further comprising:
  a flexible display panel;
  two reels, wherein each of two ends of the flexible display panel is coupled to the reel;
  two housings, wherein each of the housings is used to respectively sleeve the reel and each of the housings includes an opening which allows the flexible display panel to go through;
  a telescope support member includes two ends respectively coupled to the side wall of each of the housings;

wherein the flexible display panel is able to be rolled up and the telescope support member is to be shortened when the two housings move towards each other;

wherein the flexible display panel is able to be extended and the telescope support member is to be lengthened and the distance between the two housings is limited within the dimension of the telescope support when the two housings move away from each other;

wherein the telescope support member includes multi-level sub-support members which slide fit with each other, multi-level sub-support members includes:

two N+2th sub-support members, receiving space is formed between two ends, facing each other, of the two N+2th sub-support members;

two N+1th sub-support members, respectively sliding fit in the receiving space of the N+2th sub-support members, receiving space is formed between two ends, facing each other, of the two N+1th sub-support members;

an Nth sub-support member, sliding fit between two N+1th sub-support members, wherein N is a positive integer used to describe the level number of the sub-support members.

* * * * *